No. 610,606. Patented Sept. 13, 1898.
P. KNORPP, JR.
PNEUMATIC VEHICLE TIRE.
(Application filed Sept. 27, 1897.)
(No Model.)
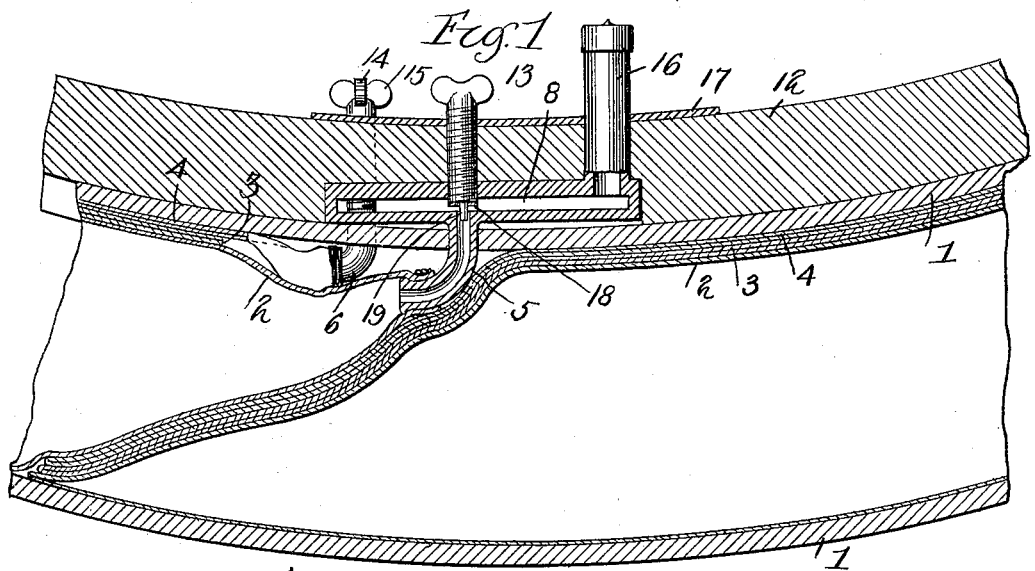
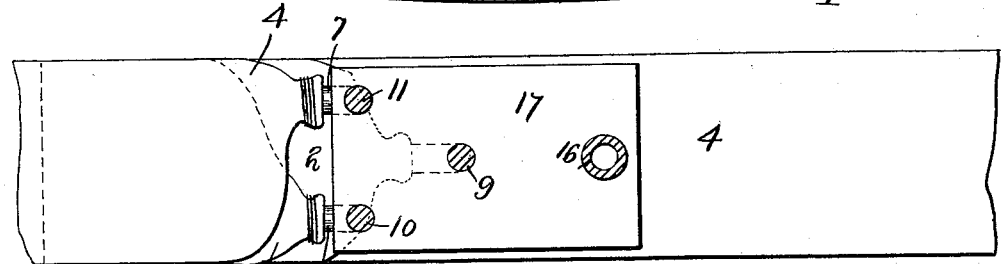
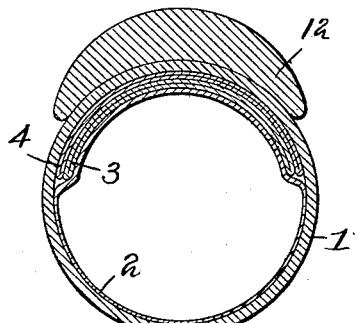
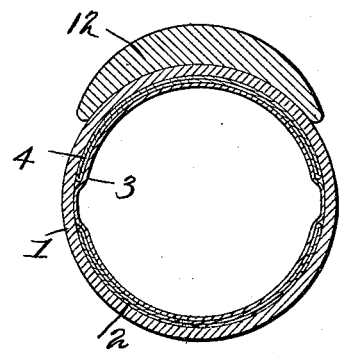
Witnesses.
Inventor.

UNITED STATES PATENT OFFICE.

PHILIP KNORPP, JR., OF CHICAGO, ILLINOIS.

PNEUMATIC VEHICLE-TIRE.

SPECIFICATION forming part of Letters Patent No. 610,606, dated September 13, 1898.

Application filed September 27, 1897. Serial No. 653,272. (No model.)

*To all whom it may concern:*

Be it known that I, PHILIP KNORPP, Jr., a citizen of the United States, residing at Chicago, in the county of Cook and State of Illinois, have invented certain new and useful Improvements in Pneumatic Vehicle-Tires, of which the following is a full, clear, and exact specification.

My invention relates to that class of pneumatic tires for velocipedes and other vehicles consisting of an inner removable air tube or chamber and an outer casing or envelop, the inner tube being provided with a valve-guarded inflating passage or stem and the outer casing being cemented or otherwise secured to the rim of the wheel and serving as a protection and reinforce for the inner tube, and my improvements have reference to means which will enable the tire to be readily inflated and used after deflation by puncture or other cause and without the necessity of repairing or patching the puncture.

The primary object of my invention is to provide the casing or envelop with a plurality of inner air-tubes each having its independent means of inflation and the whole series being so arranged that they may be successively inflated and when inflated the deflated unused tubes will be protected by the inflated one.

Another object of my invention is to provide a vehicle-tire with a plurality of inner air-tubes each having its independent valve-guarded inflating-aperture and all provided with a common admission-passage, whereby air pumped into the latter may be directed into either or all of the tubes, as desired.

With these ends in view my invention consists in certain features of novelty in the construction, combination, and arrangement of parts, whereby the said objects and certain other objects hereinafter appearing are attained, all as fully described with reference to the accompanying drawings, and more particularly pointed out in the claim.

In the said drawings, Figure 1 is a vertical longitudinal sectional view of a portion of my improved tire, showing it in place on the rim. Fig. 2 is a plan view thereof, partly in section, the rim being removed. Fig. 3 is a transverse sectional view of the rim and tire on a smaller scale, and Fig. 4 is a similar section indicating the position of the tubes after one has been punctured.

In carrying out my invention I employ an ordinary outer casing or envelop 1, which may be of the Morgan & Wright style or any other form, but preferably one closed throughout the greater part of its extent with a laced opening for the insertion of the inner tubes. Arranged within this casing 1, one upon the other, in the manner indicated in Fig. 3, are a plurality of inner casings 2 3 4, which are preferably inflated one at a time and the inflated one used until punctured, whereupon the next one immediately above is inflated, and so on until all of the tubes have been punctured, whereupon they may be removed and repaired and then replaced; but the object in having the plurality of tubes is to enable the rider to inflate his tire and ride to his destination without the necessity of repairing the punctured tube. In the example of my invention shown in the drawings I have illustrated three of these inner tubes; but it will of course be understood that any desired number might be employed. One end of each of these tubes is closed and lapped under the others, as indicated in Fig. 1, while each of the other ends is contracted and secured hermetically over the lower end of a nipple 5 6 7, respectively, projecting downwardly from a chamber 8, into which all of the nipples open. Each of these nipples is capable of being closed by a valve 9, 10, and 11, respectively, having a stem screw-threaded in the upper side of the chamber 8 and projecting through the rim 12 and having upon its outer end a thumb-piece 13 14 15, respectively, or any other desired means whereby the valve may be forced against or removed from its seat. The chamber 8 is also provided with a valve-tube or inflating-passage 16 of the ordinary or any suitable construction, to which the pump might be secured when it is desired to inflate the tire. The chamber 8 is preferably set into a shallow recess in the rim 12, and the valve-stems and tube 16 pass through the rim and also through a reinforce-plate 17, secured to the outer side thereof. The nipples 6 7 are preferably arranged one at each corner of the chamber 8, while the nipple 5 is located at an intermediate point and back of the nipples 6 7, so that the inner tubes 3 4 may be lapped one over the other and their ends diverged to meet the nipples 6 7, as indicated in Fig. 2, while the tube 2 passes under the nipples 6 7 and is also lapped under the edges 3 4, the nipple 5 being projected slightly below the nipples 6 7, if desired. Each of the valves 9 10 11 is provided with a gasket 18, through which passes a pin 19, which latter is of less diameter than the nipple and enters the same in the manner shown in Fig. 1, and thus prevents the displacement of the gasket.

With this construction it will be seen that by opening either of the valves 9 10 11 either of the inner tubes may be inflated by injecting air through the common filling tube or passage 16, and when sufficiently inflated the air may be retained by screwing the valve down in position against the bottom of the chamber 8, or, if desired, all of the inner tubes may be inflated by loosening their valves before air is injected into the chamber 8.

Having thus described my invention, what I claim as new therein, and desire to secure by Letters Patent, is—

The combination with the rim 12 having its inner face recessed, a flat valve-chamber embedded in said recess flush with the inner face of the rim and having the valved filling-tube 16 projecting through the outer side of the rim, an outer casing surrounding said rim, the nipples 6 7 projecting downwardly through said casing from the bottom of said chamber at each corner thereof and having their ends curved in the direction of the rim; the nipple 5 projecting downwardly through said casing from the bottom of said chamber at a point to the rear of and between said nipples 6 7 and being longer than said nipples 6 7 and having its end also turned in the direction of the curve of said nipples 6 7, the valve-stems 9 10 11 projecting through the rim and being threaded in said chamber and adapted to close said nipples respectively, and an independent inner tube secured to each of said nipples, substantially as set forth.

PHIL. KNORPP, JR.

Witnesses:
EDNA B. JOHNSON,
F. A. HOPKINS.